Aug. 16, 1955   J. B. MOHLER   2,715,259
STEEL BACKED ALUMINUM LINED BEARINGS
Filed March 5, 1952

INVENTOR.
James B. Mohler
BY
HIS ATTORNEYS

United States Patent Office 2,715,259
Patented Aug. 16, 1955

2,715,259
STEEL BACKED ALUMINUM LINED BEARINGS

James B. Mohler, New Castle, Pa., assignor to Johnson Bronze Company, New Castle, Pa., a corporation of Pennsylvania Application March 5, 1952, Serial No. 274,983

1 Claim. (Cl. 29—196.2)

This invention relates to steel backed aluminum lined bearings and to improvements in such bearings obtained by the use of certain electrodeposited layers of overlay metals.

It is now recognized that engines which operate under various conditions of load, speed, corrosion, dirt and alignment require different bearing constructions in order to operate satisfactorily.

It has been common practice for many years to use steel backed bearings lined with bearing metals for heavy duty bearing applications. These bearings, known as bearing inserts or thin wall bearings, have the advantage of higher fatigue resistance than bearings made of solid bearing metal.

Figure 1:
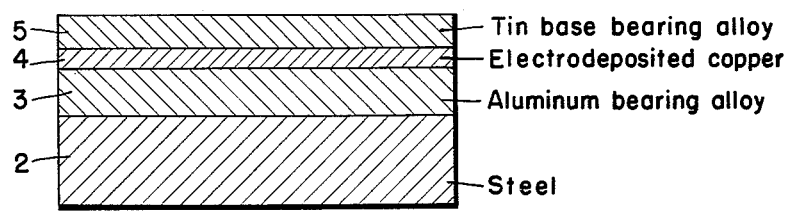
Figure 2:
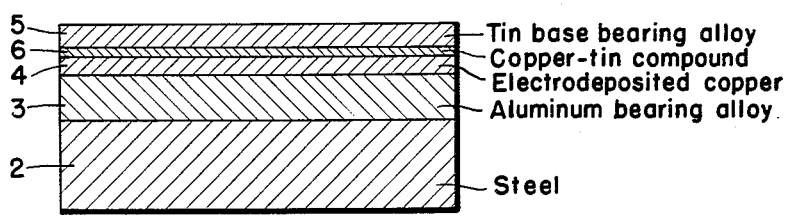

In the accompanying drawings which illustrate a preferred embodiment of my invention, Figure 1 is a diagrammatic cross-section through a strip of bearing material which can be formed later into a bearing, the figure showing the different layers making up my bearings; and Figure 2 is a view similar to Figure 1 but illustrating the formation of a layer of copper-tin compound during use of the bearing at high temperature.

Thin wall bearings are now being used that consist of aluminum bearing alloys bonded to a steel back. These aluminum bearing alloys will only function satisfactorily in a high load engine under conditions such that the shaft is hard and smooth, and has a sufficient running clearance with the bearing. Under less perfect conditions, the bearing will only run satisfactorily when provided with an overlay. One method of making such steel backed aluminum lined bearings having an overlay of lead-base bearing alloy is as follows. A clean aluminum layer is bonded to a steel back in a known manner. The aluminum is provided with a layer of zinc by immersing it in a suitable zinc bath, a thin layer of copper is then deposited on the zinc layer from a copper strike solution, the copper layer having a thickness of 0.02–0.05 mil, and then a layer of lead-base overlay alloy is electrodeposited on the thin copper layer. The process is known as the "zincate" process for electroplating on aluminum.

Although electrodeposited lead base alloys have been used to a considerable extent as overlay bearing metals, they have certain disadvantages. The major disadvantage of such lead base alloys when used in an engine is that they corrode. This corrosion can be inhibited by the addition of tin to the lead base alloys, but this leads to the formation in use of copper-tin compound caused by the reaction of the tin in the lead base bearing alloy with the copper of the copper strike layer used for bonding the lead base overlay layer to the aluminum bearing layer. The formation of the copper-tin compound, which is considered by many to be objectionable, can be inhibited by providing a barrier layer of nickel between the tin-containing lead base alloy and the copper strike layer. However, the use of a nickel barrier layer is objectionable in that when the lead base overlay layer has worn away, the nickel barrier layer is not of such character as to provide good bearing properties, nor is it of such character as to properly provide for embedding hard particles which may become detached from the shaft or which may consist of dirt or steel chips from machining operations, particularly when the engine is new.

In an attempt to improve the corrosion resistance of the bearings, I employed tin base overlay alloy in place of lead base overlay alloy, using the same method of bonding the tin base alloy to the aluminum layer as had been used in bonding the lead base alloy to the aluminum layer. That is, I used the "zincate" process which involved providing a copper strike layer having a thickness of 0.02–0.05 mil between the aluminum layer and the tin base alloy overlay layer. I found, however, that difficulties resulted after bonding tin base alloys to aluminum by this process which were not encountered in bonding lead base alloys to aluminum. At high engine temperatures, the tin of the overlay alloy combines with the thin copper bonding layer to form copper-tin compound which deteriorates in time so that the bond to the aluminum layer does not have sufficient life. I found, however, that adequate bonding could be maintained even under high engine temperatures if the thin copper bonding layer having a maximum thickness of 0.05 mil was replaced by a much thicker layer of copper. I found that in order to adequately maintain bond of tin base overlay alloys to aluminum, it was necessary that the bonding layer of copper be at least 0.1 mil thick, and preferably at least 0.2 mil thick. Heavier copper layers up to 0.5 mil thick may be used where desired. Tests have shown that a steel backed aluminum lined bearing with a 0.2 mil thick layer of copper, and a 0.5 mil overlay of tin, has a hot bond life of 200–400 hours at 300° F. Thinner tin layers give even a longer hot bond life. Also, at lower bearing temperatures, the bond life is longer.

Referring more particularly to the accompanying drawings, in Figure 1 there is illustrated a bearing having a steel back 2, having a layer 3 of aluminum bearing alloy bonded to the steel back. A layer 4 of electrodeposited copper is bonded to the aluminum bearing alloy layer 3, and a layer 5 of electrodeposited tin or tin base bearing alloy is bonded to the copper layer 4. The steel back may be S. A. E. 1010 steel, the back having a thickness of 100 mils. The aluminum bearing alloy layer 3 may be an aluminum bearing alloy containing 6% tin, 1% copper, 1% nickel and 1% silicon, the balance being aluminum. The thickness of the layer 3 may be 20 mils. The electrodeposited copper layer 4 may have a thickness between 0.1 and 0.5 mil, and is preferably about 0.2 mil thick. The layer 5 may have a thickness between 0.2 and 2.0 mils. The layer 5 may consist of electrodeposited pure tin or electrodeposited tin alloy containing up to 8% of copper or antimony or a combination of both of these metals, the balance being tin. In the claim, the expression "tin base bearing material" is used to cover either the pure tin or the tin alloy just referred to.

In order to point out further the advantages of the combination of layers in my bearings, the functioning of these layers in use will now be described.

When the bearing is put into use, it will run well initially because of the excellent surface properties provided by the tin base bearing material layer 5, assuming of course that usual bearing clearances are used and usual care is taken in assembly. Such a bearing is a precision bearing made to allow only for small dimensional tolerances on the precision parts, such precision parts consisting of the bearing, the shaft and the housing. Since these parts are precision made and since there are only slight allowances made in the tolerances, the bearing will not fit perfectly at first. In particular, the shaft will not seat perfectly into the bearing. When the engine is first started, it will bear on high areas on the surface of the tin layer 5. For a short time, these areas will be under a high load, but seizure will not take place because of the good surface properties of the tin. At the same time, the soft tin will wear away and be moved under the influence of the load until a much larger area is bearing the load. After the bearing has worn in and conformed due to some movement of the bearing as a whole, it will then function at high efficiency. After this has taken place, there will still be a tin layer present and this layer will have a relatively long life. During this period in which the tin is present, there is little danger of seizure at low clearances because of the presence of the soft metal. Also, dirt that is commonly found in new engines is tolerated by a soft bearing surface better than by a harder metal. As the warm engine runs, a layer of copper-tin compound, designated by reference numeral 6 in Figure 2, will start to form between the tin layer 5 and the copper layer 4. As this copper-tin compound layer 6 thickens, its rate of formation will become slower, thus preventing excessive growth at engine temperatures. Eventually, the tin layer 5 will wear through. The copper-tin layer 6 will be exposed, but it will be broken up and embedded in the soft electrodeposited copper layer 4, and in the relatively soft aluminum bearing alloy layer 3. By this time, the bearing will have conformed to the shaft, and be well worn in and the shaft will be well seated. Also, there will be greater clearances after the tin and copper layers have worn off, and under these conditions, the aluminum bearing alloy layer 3 will function satisfactorily.

It will be seen that a bearing made in accordance with my invention in which the layer 5 is tin or tin base alloy will have better resistance to corrosion than a bearing in which the overlay layer is lead or lead base alloy.

Furthermore, my bearing does not require the presence of a nickel barrier layer, which is objectionable in that it does not have as good bearing properties as my layer 4 of electrodeposited copper, nor does it have the ability to embed hard particles which my electrodeposited copper layer has. In my bearing, the provision of the different layers insures that it will operate satisfactorily throughout a long life during which its various bearing layers are being worn away.

The invention is not limited to the preferred embodiment, but may be otherwise embodied or practiced within the scope of the following claim.

I claim:

A bearing comprising a steel back, a layer of aluminum base bearing alloy bonded to the steel back, a layer of electrodeposited copper having a thickness of 0.1–0.5 mil bonded to the aluminum alloy bearing layer, and a layer of electrodeposited tin base bearing material having a thickness of 0.2–2.0 mils bonded to the copper layer.

References Cited in the file of this patent

UNITED STATES PATENTS

| | | |
|---|---|---|
| 1,755,686 | De Jahn | Apr. 22, 1930 |
| 2,060,034 | Chandler | Nov. 10, 1936 |
| 2,086,841 | Bagley et al. | July 13, 1937 |
| 2,333,227 | Bagley | Nov. 2, 1943 |
| 2,513,365 | Rogoff | July 4, 1950 |
| 2,586,099 | Schultz | Feb. 19, 1952 |

FOREIGN PATENTS

| | | |
|---|---|---|
| 660,389 | Great Britain | Dec. 30, 1948 |
| 635,368 | Great Britain | Nov. 1, 1950 |